(12) United States Patent
Delaune et al.

(10) Patent No.: US 9,748,005 B2
(45) Date of Patent: Aug. 29, 2017

(54) APPARATUS AND METHOD TO INSPECT NUCLEAR REACTOR COMPONENTS IN THE CORE ANNULUS, CORE SPRAY AND FEEDWATER SPARGER REGIONS IN A NUCLEAR REACTOR

(71) Applicant: WESTINGHOUSE ELECTRIC COMPANY LLC, Cranberry Township, PA (US)

(72) Inventors: Jonathan K. Delaune, Harrison, TN (US); Michael E. Freeman, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 312 days.

(21) Appl. No.: 15/075,440

(22) Filed: Mar. 21, 2016

(65) Prior Publication Data

US 2016/0247586 A1 Aug. 25, 2016

Related U.S. Application Data

(62) Division of application No. 13/832,082, filed on Mar. 15, 2013, now Pat. No. 9,324,464.

(51) Int. Cl.
*G21C 17/00* (2006.01)
*G21C 17/013* (2006.01)
(Continued)

(52) U.S. Cl.
CPC ......... *G21C 17/013* (2013.01); *G21C 17/003* (2013.01); *G21C 17/01* (2013.01);
(Continued)

(58) Field of Classification Search
CPC ...... G21C 17/00; G21C 17/003; G21C 17/01; G21C 17/013
See application file for complete search history.

(56) References Cited

U.S. PATENT DOCUMENTS 4,169,758 A 10/1979 Blackstone et al.
6,431,271 B1 8/2002 Thomeer et al.
(Continued)

FOREIGN PATENT DOCUMENTS

JP 2007266262 A 4/2007
JP 2008057981 A 3/2008

OTHER PUBLICATIONS

European Patent Office, Extended European Search Report for European Application No. 14771171.7, mailed Oct. 17, 2016.
(Continued)

*Primary Examiner* — Marshall O'Connor
(74) *Attorney, Agent, or Firm* — Eckert Seamans Cherin & Mellott, LLC; Carol A. Marmo

(57) ABSTRACT

This invention generally concerns robotic systems and is specifically concerned with an improved apparatus and method for inspecting nuclear reactor components in limited access areas, such as, the core annulus, core spray and feedwater sparger regions of a nuclear reactor. This invention includes an apparatus for remotely operating and positioning at least one inspection device for inspecting at least one component in an annulus region of a reactor pressure vessel of a nuclear power plant. The apparatus includes a track, a braking system and a frame assembly which has a frame movably connected to the track, at least one mast assembly and at least one mast positioning assembly. The at least one inspection device is attached to the at least one mast assembly. In certain embodiments, the at least one mast assembly includes a mast that is capable of becoming rigidly stable in both an extended tube form and a retracted rolled form.

10 Claims, 5 Drawing Sheets

(51) Int. Cl.
    *G21C 17/003*    (2006.01)
    *G21C 17/01*    (2006.01)
(52) U.S. Cl.
    CPC .... *G21Y 2002/202* (2013.01); *G21Y 2002/40* (2013.01); *G21Y 2002/501* (2013.01); *G21Y 2004/501* (2013.01); *G21Y 2004/502* (2013.01)

(56) References Cited

U.S. PATENT DOCUMENTS

| | | |
|---|---|---|
| 7,092,477 B2 | 8/2006 | Wivagg et al. |
| 8,111,802 B2 | 2/2012 | Rowell et al. |
| 2007/0146480 A1 | 6/2007 | Judge, Jr. et al. |
| 2011/0012003 A1 | 1/2011 | Woodruff et al. |

OTHER PUBLICATIONS

International Search Report and Written Opinion of the International Searching Authority for PCT/US2014/020179 dated Jun. 17, 2014 (Forms PCT/ISA/220, PCT,/ISA 210, PCT/ISA/237).

APPARATUS AND METHOD TO INSPECT NUCLEAR REACTOR COMPONENTS IN THE CORE ANNULUS, CORE SPRAY AND FEEDWATER SPARGER REGIONS IN A NUCLEAR REACTOR

CROSS REFERENCE TO RELATED APPLICATION

This application is a divisional application of U.S. Ser. No. 13/832,082, filed on Mar. 15, 2013, entitled APPARATUS AND METHOD TO INSPECT NUCLEAR REACTOR COMPONENTS IN THE CORE ANNULUS, CORE SPRAY AND FEEDWATER SPARGER REGIONS IN A NUCLEAR REACTOR, and claims priority thereto.

FIELD OF THE INVENTION

This invention generally concerns robotic systems and is specifically concerned with an improved apparatus and method for inspecting nuclear reactor components in limited access areas, such as, the core annulus, core spray and feedwater sparger regions of a nuclear reactor.

BACKGROUND OF THE INVENTION

A nuclear reactor produces electrical power by heating water in a reactor pressure vessel that contains a nuclear fuel core in order to generate steam which is used in turn to drive a steam turbine. The reactor pressure vessel includes a cylinder surrounding the nuclear fuel core. This cylinder is referred to as the core shroud. Feed water is admitted into the reactor pressure vessel and flows through an annular region which is formed between the reactor pressure vessel and the core shroud. Within the annular region, jet pump assemblies are circumferentially distributed around the core shroud.

The core shroud and other components in the reactor pressure vessel are examined periodically to determine their structural integrity and the need for repairs. Visual inspection is a known technique for detecting cracks in nuclear reactor components. The components to be examined may be difficult to access. For example, examination access of the core shroud is limited to the annular space between the outside of the shroud and the inside of the reactor pressure vessel, between adjacent jet pumps.

Further, the inspection areas in a reactor pressure vessel are highly radioactive, and are located under water 50 to 80 feet below the operator's work platform. Thus, inspection of the internal components of the reactor pressure vessel requires a robotic device which can be installed remotely and operated within a narrowly restricted space.

Remote operation is preferred due to safety risks associated with radiation in the reactor. During reactor shutdown, servicing of components typically requires installation of inspection manipulators or devices 30 to 100 feet deep within reactor coolant. The inspection equipment consists of manually controlled poles and ropes to manipulate servicing devices and/or positioning of these devices. Relatively long durations are required to install or remove manipulators and can impact the plant shutdown duration. In addition, different inspection scopes can require several manipulator reconfigurations requiring additional manipulator installations and removals. The long durations cannot only impact plant shutdown durations, but also increase personnel radiation and contamination exposure.

Plant utilities have a desire to reduce the number of manipulator installations and removals to reduce radiological exposure as well as cost and plant outage impact. This invention allows the number of reconfigurations, installations and removals to be minimized. In addition, plant utilities have relatively small working areas near the access point of the reactor cavity. Therefore, the size of the manipulators can impact other activities during plant shutdown.

SUMMARY OF THE INVENTION

The invention provides apparatus and methods for inspecting at least one component in an annulus region of a reactor vessel. In one aspect, the invention provides an apparatus for remotely operating and positioning at least one inspection device for inspecting a component in a reactor pressure vessel of a nuclear power plant. The apparatus includes a track positioned on an annular rim of a core shroud in the reactor pressure vessel and horizontally movable along the rim, a braking system, and a frame assembly. The frame assembly includes a frame movably connected to the track such that the frame is horizontally movable along the track. The apparatus further includes at least one mast assembly, at least one mast rotation assembly, and at least one pan and tilt assembly. The at least one inspection device is attached to the pan and tilt assembly and the at least one inspection device travels along the rim due to horizontal movement of at least one of the track and the frame assembly.

The braking system can be activated such that the track is stationary and the frame assembly is horizontally movable along the track or the braking system can be released such that the track is horizontally movable along the rim of the reactor component and the frame assembly is stationary. A first mast assembly can be positioned on one side of the frame and a second mast assembly can be positioned on an opposite side of the frame. A first mast rotation assembly can positioned on one side of the frame and a second mast rotation assembly can be positioned on an opposite side of the frame. A first pan and tilt assembly can be positioned on one side of the frame and a second pan and tilt assembly can be positioned on an opposite side of the frame.

The frame assembly can include a positioning motor and gear combination to move the frame assembly along the track.

The inspection device can be a camera.

In another aspect, the invention provides a method for inspecting an annulus region of a reactor pressure vessel in a nuclear power plant. The method includes positioning a track on an annular rim of the reactor pressure vessel such that the track is horizontally movable along the rim and positioning a frame assembly on the track. The frame assembly includes a frame movably connected to the track such that the frame is horizontally movable along the track. The method further includes connecting at least one mast assembly to the frame assembly, connecting at least one mast positioning assembly to the frame assembly, at least one pan and tilt assembly to the frame assembly and at least one inspection device to the frame assembly. The method further includes connecting a braking system to the track and the frame assembly, and moving horizontally at least one of the track and the frame assembly along the rim.

Engaging the braking system can result in the track being horizontally moved from a first position to a second position along the rim and the frame assembly remains stationary or the frame assembly being horizontally moved from a first position to a second position along the track and the track remains stationary.

The method can further include assessing the inspection results and determining if modification or repair of the component is needed.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENTS

The invention relates to robotic devices for remotely inspecting nuclear reactor components in a reactor pressure vessel of a nuclear power plant, such as components in the core annulus, core spray and feedwater sparger regions. The invention incorporates motion and electro pneumatics to provide position feedback for remotely inspecting the internal components of a reactor pressure vessel. The compact design of the invention allows for positioning and operation of the device in limited access areas.

In certain embodiments, the nuclear power plant includes a light water reactor, such as a boiling water reactor or a pressurized water reactor. For example, boiling water reactors typically utilize a jet pump system as a means of regulating reactor flow. In a common arrangement, jet pumps are located in the annulus area just inside the reactor vessel invert. The annulus, the jet pumps and the core shroud are subject to scheduled and augmented inspections that may result in required maintenance.

It is to be understood that the apparatus of the invention can be applied to inspecting a variety of nuclear components and structures in a reactor pressure vessel and various known inspection devices can be attached to the apparatus of the invention for use in performing the inspections, as well as modifications and repairs. In certain embodiments, the inspection devices include a camera.

Figure 1:
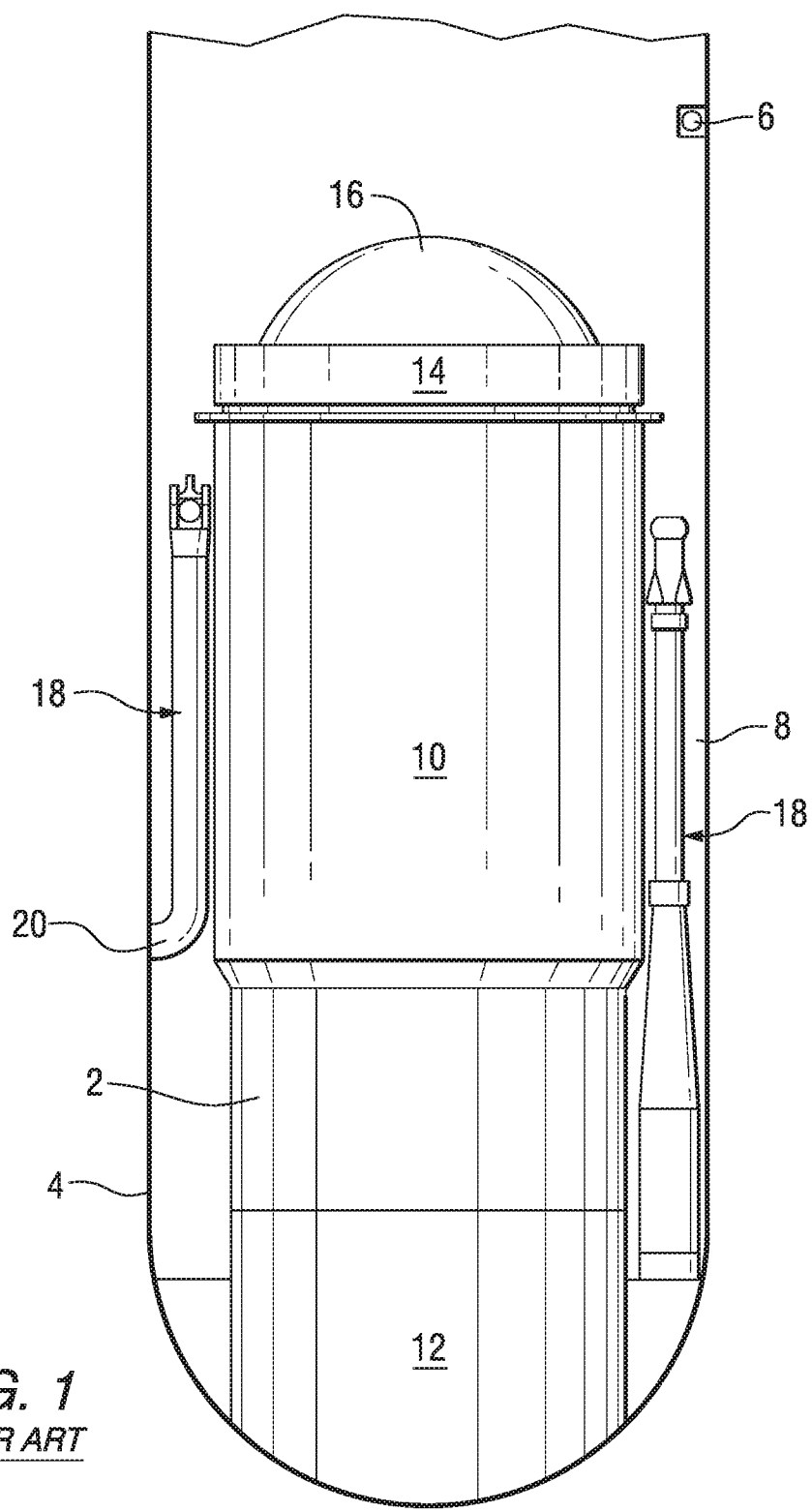
FIG. 1 is a schematic showing an elevational view of pertinent portions of a conventional BWR.

Referring to FIG. 1, there is illustrated a reactor pressure vessel (RPV) 4 of a conventional boiling water reactor (BWR). Feedwater is admitted into the RPV 4 via a feedwater inlet (not shown) and a feedwater sparger 6, which is a ring-shaped pipe having suitable apertures for circumferentially distributing the feedwater inside the RPV 4. The feedwater from the sparger 6 flows downwardly through a downcomer annulus 8, which is an annular region formed between a core shroud 2 and the RPV 4.

The core shroud 2 is a stainless steel cylinder surrounding the nuclear fuel core, the location of which is generally designated by numeral 10 in FIG. 1. The core is made up of a plurality of fuel bundle assemblies (not shown). Each array of fuel bundle assemblies is supported at the top by a top guide and at the bottom by a core plate (neither of which are shown). The core top guide provides lateral support for the top of the fuel assemblies and maintains the correct fuel channel spacing to permit control rod insertion.

The feedwater flows through the downcomer annulus 8, around the bottom edge of the shroud 2 and into the core lower plenum 12. The feedwater subsequently enters the fuel assemblies, wherein a boiling boundary layer is established. A mixture of water and steam enters a core upper plenum 14 under a shroud head 16. The steam-water mixture than flows through vertical standpipes (not shown) atop the shroud head 16 and enters steam separators (not shown), which separate liquid water from steam. The liquid water then mixes with feedwater in the mixing plenum, which mixture then returns to the reactor core via the downcomer annulus 8. The steam is withdrawn from the RPV via a steam outlet.

The BWR also includes a coolant recirculation system which provides the forced convection flow through the core which is necessary to attain the required power density. A portion of the water is removed from the lower end of the downcomer annulus 8 via a recirculation water outlet (not visible in FIG. 1) and forced by a centrifugal recirculation pump (not shown) into jet pump assemblies 18 (two of which are shown in FIG. 1) via recirculation water inlets 20. The BWR has two recirculation pumps, each of which provides the driving flow for a plurality of jet pump assemblies. The jet pump assemblies are circumferentially distributed around the core shroud 2.

The apparatus can be positioned on the annular rim, e.g., circumferential steam dam, of the reactor pressure vessel. In certain embodiments, the apparatus can be set on the steam dam and held in place by its center of gravity. In alternate embodiments, the apparatus can be attached to the steam dam using a clamping device. In certain embodiments, such as when performing an inspection of a core shroud, the apparatus is positioned on the steam dam to support an inspection device which is lowered into the annulus formed between the reactor pressure vessel and the core shroud.

The apparatus of the invention includes a traversing assembly and a frame structure. The traversing assembly includes a track. In certain embodiments, the track is connected relative to reactor hardware via remotely controlled track clamping and/or breaking mechanisms and the frame structure is movably positioned relative to the track via remotely controller motors. In certain embodiments, the frame structure travels along the track from a first position to a second position. In alternative embodiments, the frame structure is stationary relative to reactor hardware via remotely controlled frame clamping and/or braking mechanisms and the track may be positioned relative to the frame via the same remotely controlled motors such that the track is moved from a first position to a second position.

Thus, the frame structure is movable to travel horizontally along the track and, the track contains motors and brakes which are systemically configured to move the track which allows the use of this apparatus with a partial track such that a complete track ring is not needed.

At least one mast assembly, at least one positioning, e.g., rotation, assembly, at least one pan and tilt assembly and at least one inspection device are connected or coupled to the frame structure.

Figure 2:
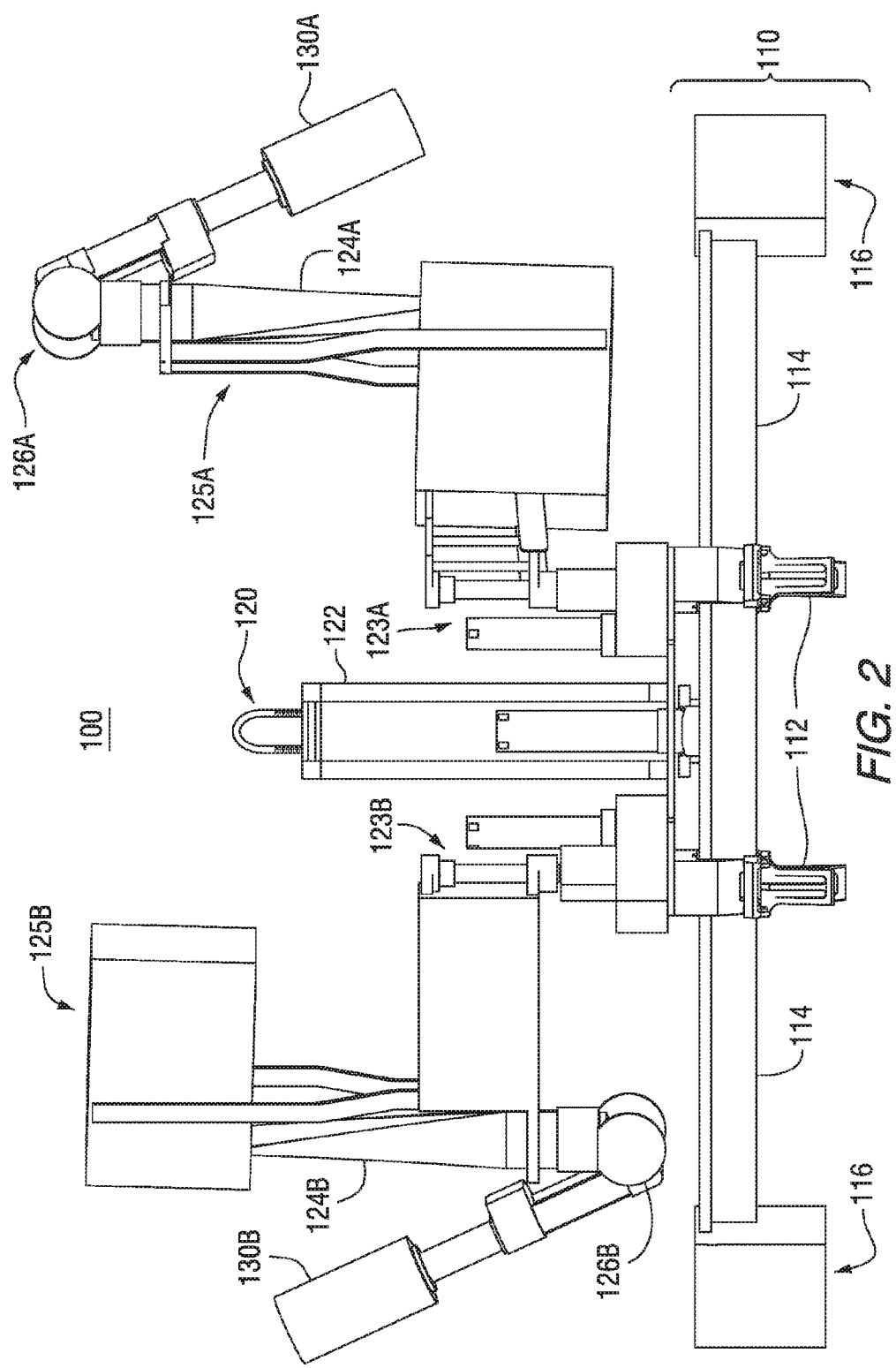
FIG. 2 is a front view of an inspecting apparatus, in accordance with certain embodiments of the invention.

Referring to FIG. 2, there is illustrated a nuclear reactor component inspecting apparatus generally referred to by reference character 100 for inspecting a nuclear reactor component in a reactor pressure vessel, in accordance with certain embodiments of the invention. The apparatus 100 includes a traversing assembly generally referred to by reference character 110 and a frame assembly generally referred to by reference character 120. The traversing assembly 110 includes a clamping device 112, a track 114 and a braking system 116. The clamping device 112 is operable to movably connect the track 114 to an annular rim, e.g., circumferential steam dam, of the reactor pressure vessel. In certain embodiments, the clamping device 112 connects the track 114 to a steam dam of a reactor pressure vessel (not shown). The braking system 116 when activated is operable to retain the track 114 in a stationary position and when deactivated, is operable to allow the track 114 to horizontally move relative to the frame assembly 120.

The frame assembly 120 is movably connected to the track 114 and includes a frame 122, a first mounting assembly 123A positioned to the right side of the frame 122, a second mounting assembly 123B positioned to the left side of the frame 122, a first mast assembly 124A positioned to the right side of the frame 122, a second mast assembly 124B positioned to the left side of the frame 122, a first mast rotation assembly 125A positioned to the right side of the frame 122 and a second mast rotation assembly 125B positioned to the left side of the frame 122. Each of the two mounting structures 123A,B house a movable mast assembly 124A,B, respectively, for deployment of an inspection device 130A,B. In certain embodiments, the inspection device 130A,B is a camera. Mast rotation assemblies 125A,B are provided to allow rotation of the mast assemblies 124A,B relative to the traversing system 110 to provide at a given radial location within the reactor component. The mast rotation assemblies 125A,B include load bearing hardware and remotely operated motors (both not shown). In certain embodiments, the invention includes the use of a mast assembly system which is commercially available under the trade name RolaTube. This mast assembly system includes a remotely controlled drive system, such as a motor/cog drive system, to position the inspection device to a given elevation. This roll-up type of mast can be rolled up to 10% of its extended length which allows for a compact and efficient system.

FIG. 2 also includes a first pan and tilt assembly 126A positioned on one side of the frame 122 and a second pan and tilt assembly 126B positioned on an opposite side of the frame 122. The pan and tilt assemblies 126A,B are mounted to the first and second mast rotation assemblies 124A,B, respectively, and provide a means for positioning an inspection device at a vector angle relative to the mast rotation assemblies 125A,B. The pan and tilt assemblies 126A,B include remotely operated motors and gearing (both not shown) to support and protect the inspection device. The inspection devices 130A,B are attached to the pan and tilt assemblies 126A,B, respectively.

As shown in FIG. 2, the inspecting apparatus 100 has two mast assemblies, two mast rotation assemblies and two pan and tilt assemblies. However, it is contemplated that in other embodiments of the invention, the inspecting apparatus can include only one of each of the mast assembly, mast rotation assembly and pan and tilt assembly. For example, referring to FIG. 2, in certain embodiments, the invention can include the mast assembly 124A or 124B on either side of the frame assembly 122.

Further, it is contemplated that the inspecting apparatus 100 can include more than one inspection device 130A,B attached to the pan and tilt assembly 126A,B.

Referring to FIG. 2, when the braking system 116 is activated, the track 114 remains stationary and the frame assembly 120 is horizontally movable along the track 114 and when the braking system 116 is deactivated or released, the track 114 is driven into a different position, for example, along the rim of the core shroud. The braking system 116 allows the frame assembly 120 to walk along, for example, the steam dam of the reactor pressure vessel, without requiring a complete guide track ring. Thus, frame assembly 120 is horizontally movable to drive along the track 114, or alternatively, the track 114 is horizontally movable to be driven into a different position along the steam dam of the reactor pressure vessel. In certain embodiments, the inspecting apparatus 100 includes two sets of two brakes. One set is connected to the track 114 and one set is connected to the frame assembly 120.

Figure 2A:
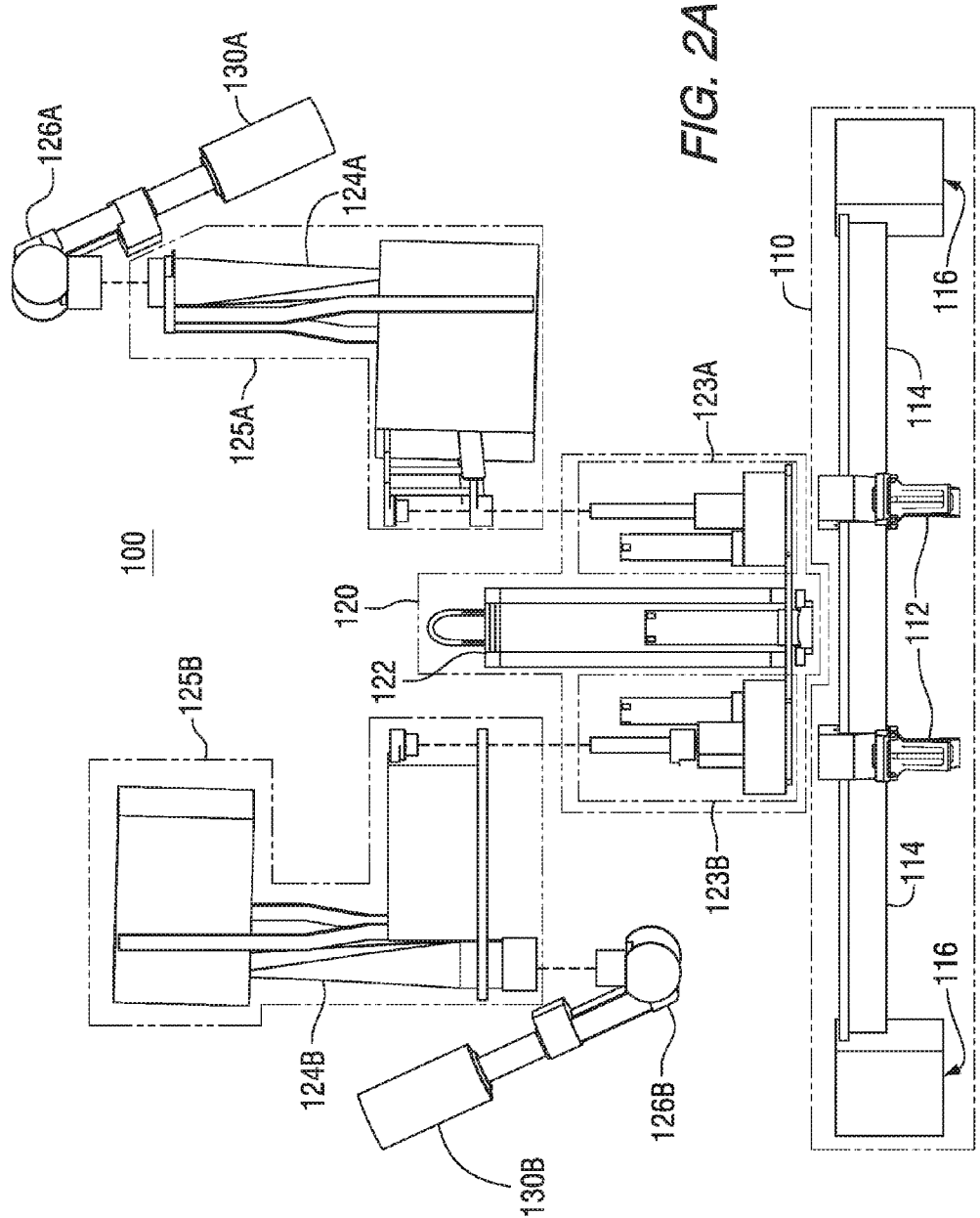
FIG. 2A is a front view of the inspecting apparatus shown in FIG. 2 with the components shown in a spaced apart arrangement, in accordance with certain embodiments of the invention.

Referring to FIG. 2A, there is illustrated the inspecting apparatus 100 of FIG. 2 wherein the component assemblies are shown in a spaced apart arrangement. In FIG. 2A, the traversing assembly 110 is shown to include the clamping device 112, the track 114 and the braking system 116 (as shown in FIG. 2). The frame assembly 120 is shown to include the frame 122 and the first and second mounting assemblies 123A,B (as shown in FIG. 2). The mast rotation assemblies 125A,B are shown to include the first and second mast assemblies 124A,B. Further, shown in FIG. 2A are the pan and tilt assemblies 126A,B and the inspection devices 130A,B connected thereto.

Figure 3:
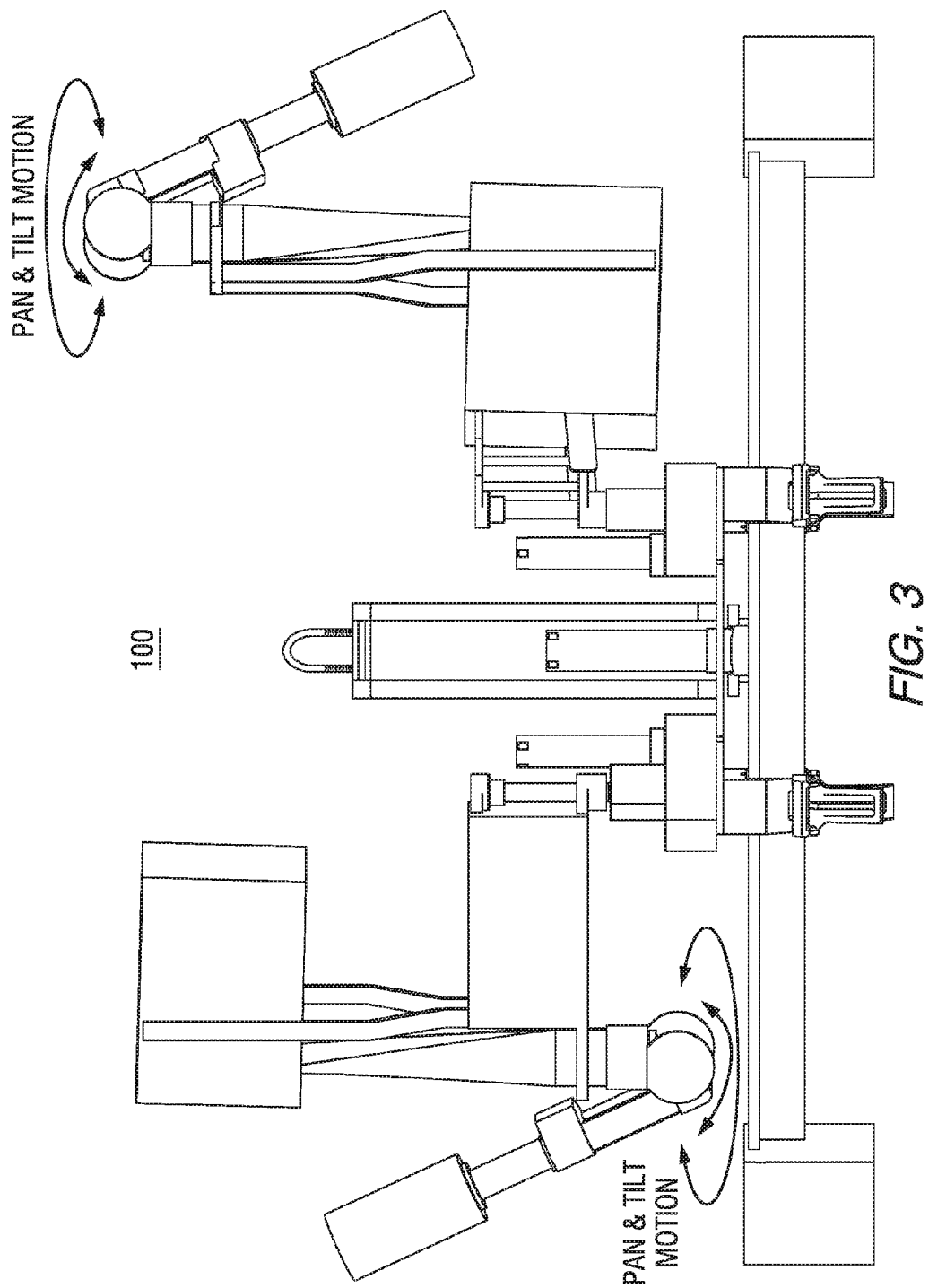
FIG. 3 is a front view of the inspecting apparatus shown in FIG. 2 with the rotation and tilt motion identified, in accordance with certain embodiments of the invention.

Referring to FIG. 3, there is illustrated the inspecting apparatus 100 of FIG. 2 wherein the rotation of the pan and tilt assemblies 126A,B are identified.

Figure 4:
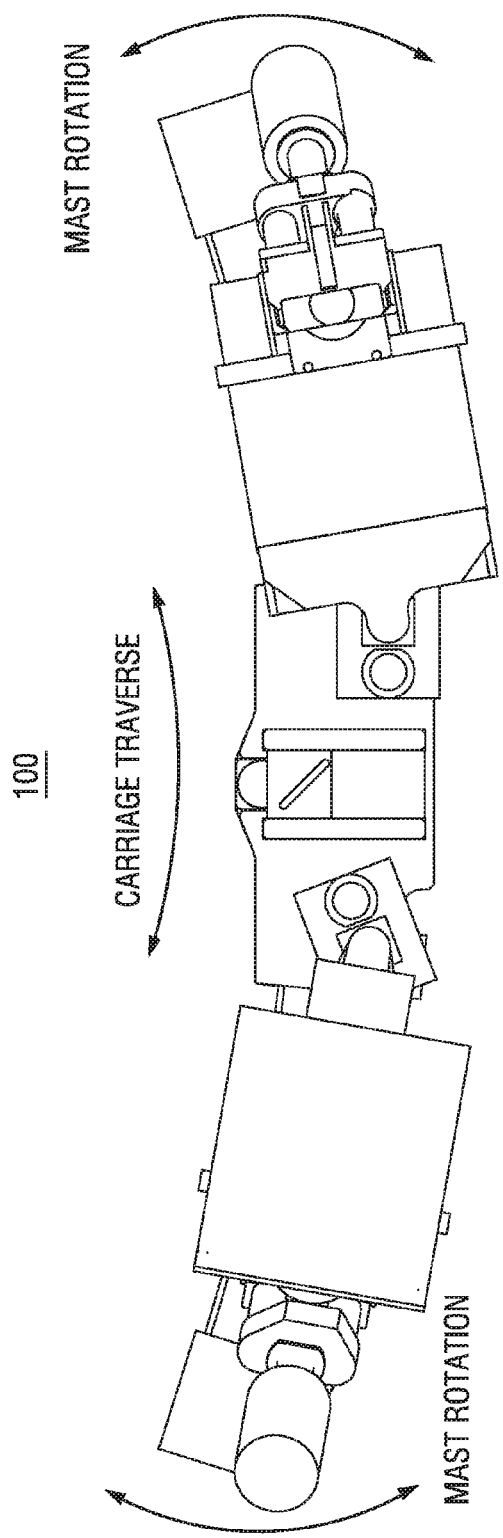
FIG. 4 is a top view of the inspecting apparatus shown in FIG. 2 with the traverse movement identified, in accordance with certain embodiments of the invention.

Referring to FIG. 4, there is illustrated a top view of the inspecting apparatus 100 of FIG. 2, wherein the traverse movement and mast rotation are identified.

In certain embodiments of the invention, the frame assembly houses articulating mast assemblies that deploy a mast that is capable of becoming rigidly stable in both an extended tube form and a retracted rolled form, with inspection end effectors attached, into the vessel to examine reactor pressure vessel components. Further, in certain embodiments, the frame assembly utilizes Rolatube as a mast. The frame assembly houses articulating mast assemblies that deploy a Rolatube mast, with inspection end effectors attached, into the vessel to examine reactor pressure vessel components.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

We claim:

1. A method for inspecting an annulus region of a reactor pressure vessel in a nuclear power plant, comprising:
   positioning a partial track on an annular rim of a core shroud in the reactor pressure vessel such that the track is horizontally movable along the rim;
   positioning a frame assembly on the partial track, the frame assembly comprising:
   a frame movably connected to the partial track such that the frame is horizontally movable along the partial track;
   connecting at least one mast assembly to the frame assembly;
   connecting at least one mast positioning assembly to the frame assembly;
   connecting at least one inspection device to the frame assembly;

connecting a braking system to the partial track and the frame assembly; and moving horizontally at least one of the partial track and the frame assembly along the rim, which comprises:

activating the braking system to horizontally move the frame assembly along the partial track with the partial track being stationary; and deactivating the braking system to horizontally move the partial track along the rim of the annular rim of the core shroud and the frame assembly being stationary; and inspecting a component in a limited access area.

2. The method of claim 1, further comprising assessing the inspection results and determining if modification or repair of the component is needed.

3. The method of claim 1, wherein the at least one mast assembly comprises a mast that is capable of becoming rigidly stable in an extended tube form and a retracted rolled form.

4. The method of claim 1, wherein the connecting at least one mast assembly to the frame assembly comprises positioning a first mast assembly on one side of the frame and a second mast assembly on an opposite side of the frame.

5. The method of claim 1, wherein the connecting at least one mast positioning device to the frame assembly comprises positioning a first mast positioning device on one side of the frame and a second mast positioning device on an opposite side of the frame.

6. The method of claim 1, wherein the connecting at least one mast positioning device to the frame assembly comprises positioning a first pan and tilt assembly on one side of the frame and a second pan and tilt assembly on an opposite side of the frame.

7. The method of claim 1, wherein moving the frame assembly along the partial track comprises connecting to the frame assembly a positioning motor and gear combination.

8. The method of claim 1, wherein the inspection device is a camera.

9. A method for inspecting a component in a nuclear power plant, comprising:

positioning a partial track on an annular rim of a core shroud in the reactor pressure vessel such that the track is horizontally movable along the rim;

positioning a frame assembly on the partial track, the frame assembly comprising:

a frame movably connected to the partial track such that the frame is horizontally movable along the partial track;

connecting at least one mast assembly to the frame assembly;

connecting at least one mast positioning assembly to the frame assembly;

connecting at least one inspection device to the frame assembly;

connecting a braking system to the partial track and the frame assembly;

moving horizontally at least one of the partial track and the frame assembly along the rim, which comprises:

activating the braking system to horizontally move the frame assembly along the partial track with the partial track being stationary; and deactivating the braking system to horizontally move the partial track along the rim of the annular rim of the core shroud and the frame assembly being stationary; and inspecting a component in a limited access area selected from a core annulus, core spray region and feedwater sparger region.

10. The method of claim 9, further comprising lowering the inspection device into an annulus formed between the reactor pressure vessel and the core shroud; and inspecting the core shroud.

* * * * *